United States Patent Office 3,154,512
Patented Oct. 27, 1964

3,154,512
TEREPHTHALAMIDE POLYMER IN SOLVENT COMPRISING ANTIMONY TRICHLORIDE AND ACETIC OR FORMIC ACID
Krzysztof I. Parczewski, Summit, N.J., assignor to Celanese Corporation of America, New York, N.Y., a corporation of Delaware
No Drawing. Filed July 13, 1960, Ser. No. 42,465
17 Claims. (Cl. 260—31.2)

This invention relates to an improved process for the formation of shaped articles such as filaments from high molecular weight polyterephthalamides.

The high molecular weight polyterephthalamides possess various characteristics which are considered desirable for the formation of shaped articles such as filaments. Some of these characteristics are, for example, good mechanical properties such as high tenacity and elongation and a high degree of dye receptivity, water insensitivity and glaze resistance, which combination of properties is not often found in the more widely-used fiber-forming polymers. However, the polyterephthalamides, especially those melting above 275° C., cannot be as easily melt spun as many of these more widely used polymers, because of their tendency on being heated to a degree sufficient to melt them to seriously degrade and/or further polymerize to a useless, infusible mass. Thus, any method which can be used to form shaped articles of high molecular weight polyterephthalamides while avoiding the difficulties of melt spinning set out above is much to be desired.

It is an object of this invention to provide a method of forming useful shaped articles, e.g. filaments, from high molecular weight polyterephthalamides. It is a further object of this invention to provide a method of forming shaped articles from polyterephthalamides while avoiding the difficulties of melt spinning this type of polymer. Other objects will be apparent from the following detailed description and claims.

In accordance with one aspect of the invention, a high molecular weight polyterephthalamide is dissolved in a solvent comprising at least 70% by weight of antimony trichloride and as a diluent, formic or acetic acid whtich is present in an amount up to 30% by weight of the total solvent. The diluent is generally used in an amount of at least 5% by weight of the solvent. By means of the solvent mixtures of this invention, polymer solutions may be prepared which are liquid at room temperature, i.e. 25° C., and which can be extruded through a suitably shaped opening, e.g. the orifices of a spinnerette to form filaments, or a slot-shaped opening to form films.

The process of this invention may be applied, for example, to fiber- and film-forming linear polyterephthalamides having repeating structural units of the formula —NR—Y—NR'—CO—p-C₆H₄—CO— which result from the condensation of terephthalic or a derivative, e.g. an ester, acyl halide or salt of such acid, with a diamine, where the R's are hydrogen or monovalent organic radicals, e.g. lower alkyl such as methyl or ethyl, and Y is a divalent organic radical such as alkylene containing 1 to 10 carbon atoms, e.g., ethylene, tetramethylene or hexamethylene, arylene such as para- or meta-phenylene, para-xylylene or para-diethylene benzene, cycloalkylene such as 1,4-cyclohexylene or divalent heterocyclic radicals such as those derived from piperazine or an alkyl-substituted piperazine wherein the open bonds are attached to nitrogen atoms.

Particularly suitable are the poly (polymethylene) terephthalamides wherein the polymethylene groups contain 1 to 10 carbon atoms, e.g. polyhexamethylene terephthalamide, polytetramethylene terephthalamide, polyethylene terephthalamide and polypiperazylene terephthalamide, i.e. derived from piperazine and terephthaloyl chloride.

The solutions formed in accordance with this invention may contain for example 5 to 30% preferably 10 to 25% of polymer based on the weight of the solution. The solutions may be prepared at a temperature within a wide range, e.g. 20 to 150° C. and may be extruded to form shaped articles at a temperature, for example, of 20 to 150° C.

A wide variety of liquids in which the polymer is insoluble may be used as the coagulating bath in the formation of shaped articles from the solutions of the invention, e.g. tetrahydrofuran, water, acetone, ethyl acetate, methyl, ethyl or isopropyl alcohol, or formic or acetic acid containing 0 to 50 grains of antimony trichloride per 100 cc. of acid.

The following examples further illustrate the invention.

Example I

Polyhexamethylene terephthalamide having an inherent viscosity of 1.29 measured as a 0.1% solution in 97% sulfuric acid and prepared by the interfacial technique from hexamethylene diamine and terephthaloyl chloride using magnesium oxide as an acid binder, as described in application Serial No. 6,885, filed February 5, 1960, by Jamison, now abandoned, was dissolved at 60° C. in a solvent consisting of 80% by weight of antimony trichloride and 20% by weight of acetic acid to yield a solution containing 10% by weight of polymer and having a viscosity of about 3000–5000 poises at 25° C. The solution was extruded through a 0.2 mm. jet into tetrahydrofuran at 30° C. to yield a useful filament of over 100 denier. The solution was similarly extruded into ethyl acetate to yield a useful filament.

Useful filaments were also obtained by extruding the spinning solution of this example into water, isopropyl alcohol, and acetic acid containing 0 to 50 grams of antimony trichloride per 100 cc. of acid.

Examples II and III

The polymer of Example I was dissolved in mixtures of antimony trichloride and formic acid containing 70 and 79% antimony trichloride based on the weight of the mixture to yield solutions containing 10% by weight of polymer and each having a viscosity of about 2000 poises at 25° C. The solutions were each extruded through a 0.1 mm. jet into spin baths of water, methanol, tetrahydrofuran and ethyl acetate to obtain useful filaments.

It is to be understood that the foregoing detailed description is given merely by way of illustration and that many variations may be made therein without departing from the spirit of my invention.

Having described my invention what I desire to secure by Letters Patent is:

1. A process comprising dissolving a high molecular weight polyterephthalamide containing repeating structural units of the formula —NR—Y—NR'—CO—p-C₆H₄—CO— where R and R' are each selected from the group consisting of hydrogen and a monovalent organic radical, and Y is a divalent organic radical, in a solvent comprising at least 70% by weight of antimony trichloride and a diluent selected from the group consisting of formic acid and acetic acid in an amount up to 30% by weight of the solvent, and extruding the resulting solution through an opening of predetermined cross-section to form a shaped article.

2. The process of claim 1 wherein said solution contains at least 5% by weight of diluent based on the weight of the solvent and 5 to 30% by weight of polymer based on the weight of the solution and is extruded into a liquid non-solvent for the polymer.

3. The process of claim 1 wherein said solution is liquid at room temperature.

4. The process of claim 3 wherein said diluent is formic acid.

5. The process of claim 3 wherein said diluent is acetic acid.

6. The process of claim 1 wherein said shaped article is a filament.

7. The process of claim 1 wherein said polymer has a melting point of at least 275° C.

8. The process of claim 1 wherein said polymer is a poly(polymethylene) terephthalamide, said polymethylene groups containing 2 to 10 carbon atoms.

9. A solution of a high molecular weight polyterephthalamide containing repeating structural units of the formula —NR—Y—NR'—CO—p-$C_6H_4$—CO—, where R and R' are each selected from the group consisting of hydrogen and a monovalent organic radical, and Y is a divalent organic radical, in a solvent comprising at least 70% by weight of antimony trichloride and a diluent selected from the group consisting of formic acid and acetic acid in an amount up to 30% by weight of the solvent.

10. The solution of claim 9 wherein said diluent is present in an amount of at least 5% by weight of the solvent and said polymer is present in an amount of 5 to 30% by weight of the solution.

11. The solution of claim 9 which is liquid at room temperature.

12. The solution of claim 9 wherein said diluent is formic acid.

13. The solution of claim 9 wherein said diluent is acetic acid.

14. The solution of claim 9 wherein said polymer has a melting point of at least 275° C.

15. The solution of claim 9 wherein said polymer is a poly (polymethylene) terephthalamide, said polymethylene groups containing 1 to 10 carbon atoms.

16. A process comprising dissolving a high molecular weight polyhexamethylene terephthalamide in a solvent comprising at least 70% by weight of the solvent of antimony trichloride and 5 to 30% by weight of the solvent of a diluent selected from the group consisting of formic acid and acetic acid, and extruding the resulting solution through an opening of predetermined cross-section to form a shaped article.

17. A solution of a high molecular weight polyhexamethylene terephthalamide in a solvent comprising at least 70% by weight of the solvent of antimony trichloride and 5 to 30% by weight of the solvent of a diluent selected from the group consisting of formic acid and acetic acid.

References Cited in the file of this patent
UNITED STATES PATENTS

| | | |
|---|---|---|
| 2,949,440 | Katz | Aug. 16, 1960 |
| 3,081,273 | Caprio | Nov. 12, 1963 |

OTHER REFERENCES

Ellis: The Chemistry of Snythetic Resins, vol. I, Reinhold, New York, 1935, page 416.

Hackh's Chemical Dictionary, 2d ed., 1937, page 406.